(No Model.)
J. & J. S. CLICK.
WIRE FENCE.
No. 508,087.  Patented Nov. 7, 1893.
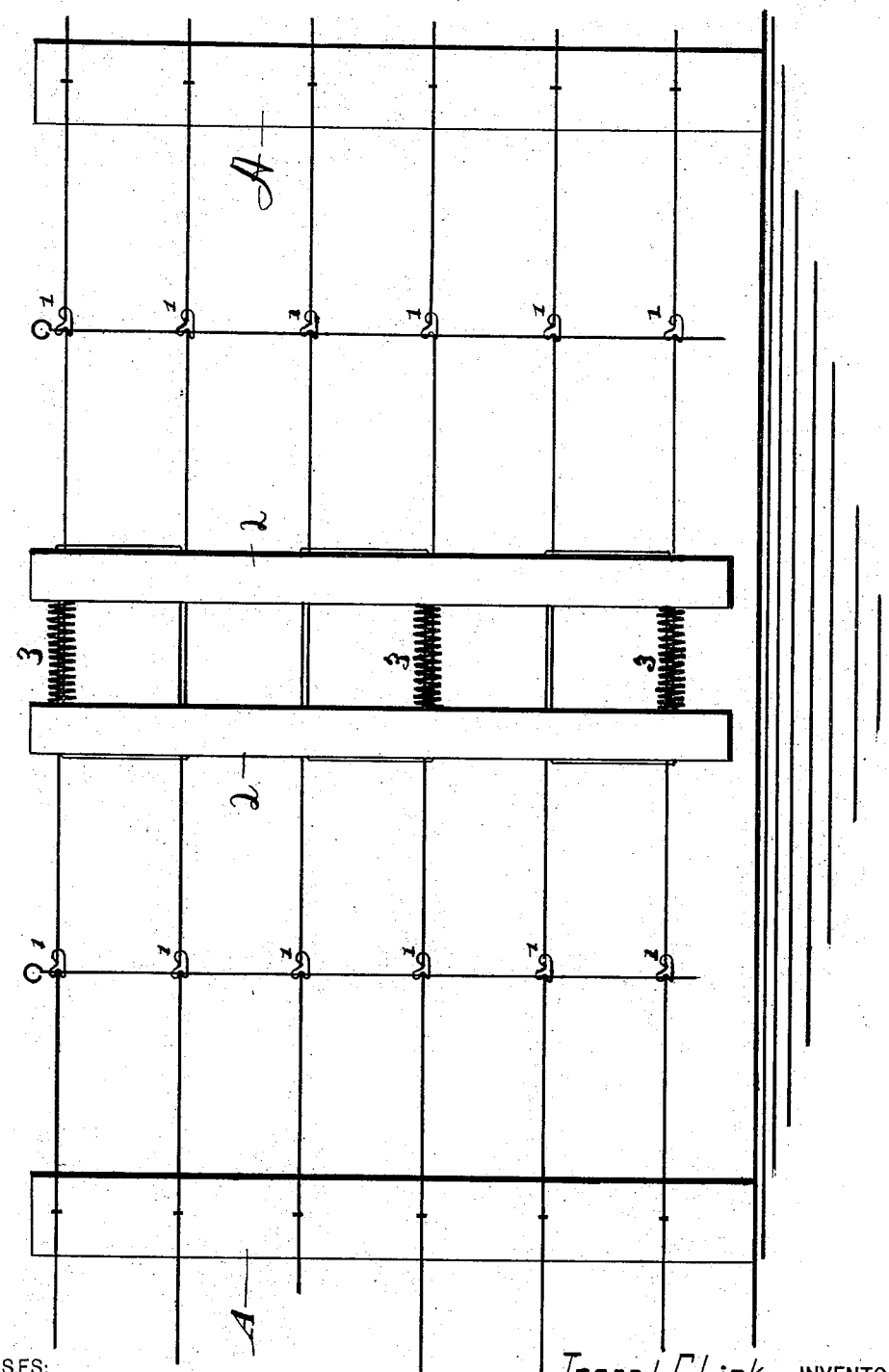
WITNESSES:
Chas. N. Marvin
C. B. Kimm
Joseph Click.  INVENTORS
Joseph S. Click.
BY
Smith & Denison
ATTORNEYS.

UNITED STATES PATENT OFFICE.

JOSEPH CLICK AND JOSEPH S. CLICK, OF BRIDGEWATER, VIRGINIA.

WIRE FENCE.

SPECIFICATION forming part of Letters Patent No. 508,087, dated November 7, 1893.

Application filed February 28, 1893. Serial No. 464,061. (No model.)

*To all whom it may concern:*

Be it known that we, JOSEPH CLICK and JOSEPH S. CLICK, of Bridgewater, in the county of Rockingham, in the State of Virginia, have invented new and useful Improvements in Wire Fences, of which the following, taken in connection with the accompanying drawing, is a full, clear, and exact description.

Our invention relates to wire fences.

Our object is to produce a wire fence adapted to take up the slack caused by heat in the summer and to allow the fence to contract in cold weather, and provide easy and convenient means for spacing the wires between the posts; cheap, durable in construction and of great utility.

Our invention consists in the several novel features of construction and operation hereinafter described and which are specifically set forth in the claim hereunto annexed.

It is constructed as follows, reference being had to the accompanying drawing, in which the preferred form of fence is shown complete and assembled by a view in elevation.

A—, are posts; and —1— are the span wires secured upon the posts and adapted to move transversely thereon.

2—2—, are bars at intervals of spaces in the fence, provided with openings of sufficient size through them to admit of the wire passing through the same, thence down through another set of openings and back to and beyond the posts —A—. These spans are preferably constructed of even sets of wires so that each wire bent as shown will form two wires upon the fence by passing through the bars above specified. Between these bars and surrounding each wire or pair of wires which lie together, are interposed coil springs which produce a tension to keep the bars as far apart as possible. It will thus be observed that this will effectually take up the slack incident to the action of the heat and cold upon the wires. It will also be observed that when the span wires are expanded in warm weather the bars —2— will be forced apart by the springs —3— so as to take up this slack, and when the wires contract in cold weather, the bars —2— will be drawn toward each other; the force caused by the contraction, being sufficient to overcome the force of the coil spring.

What we claim as our invention, and desire to secure by Letters Patent, is—

In a wire fence, a compensator, comprising duplicate vertically disposed bars provided with transverse aligned openings corresponding in number to the fence wires and through which the wires are passed as described, and the spiral springs interposed between the bars and encircling the wires, as and for the purpose specified.

In witness whereof we have hereunto set our hands this 20th day of February, 1893.

JOSEPH CLICK,
JOSEPH S. CLICK.

In presence of—
S. H. W. BYRD,
JOS. BYRD.